United States Patent [19]
Kelly

[11] Patent Number: 6,029,928
[45] Date of Patent: *Feb. 29, 2000

[54] SPACE LAUNCH VEHICLES CONFIGURED AS GLIDERS AND TOWED TO LAUNCH ALTITUDE BY CONVENTIONAL AIRCRAFT

[75] Inventor: Michael S. Kelly, Redlands, Calif.

[73] Assignee: Kelly Space & Technology Inc., San Bernardino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/782,769

[22] Filed: Jan. 13, 1997

Related U.S. Application Data

[63] Continuation-in-part of application No. 08/342,596, Nov. 21, 1994, Pat. No. 5,626,310.

[51] Int. Cl.[7] .................................................. B64D 5/00
[52] U.S. Cl. ............................ 244/2; 244/158 R; 244/63
[58] Field of Search .................................. 244/158 R, 2, 244/3, 63, 118.1, 135 L, 135 R, 172, 129.5, 161

[56] References Cited

U.S. PATENT DOCUMENTS

| | | | |
|---|---|---|---|
| 2,402,918 | 6/1946 | Schultz | 244/3 |
| 2,407,634 | 9/1946 | Du Pont | 244/3 |

(List continued on next page.)

OTHER PUBLICATIONS

Butowski, Piotr "Russian Flight Refuelling," *Air International*, vol. 55, No. 2, Aug. 1998, pp. 100–105.

Clapp, Mitchell Burnside, "The Black Horse—Pioneer Rocketplane News Flash!" Oct. 27, 1998, 2 pp. http:/www.im.lcs.mit.edu/bh.

Clapp, Mitchell Burnside, "In Flight Propellant Transfer Spaceplane Design and Testing Consideration," AIAA 95–2955, Oct. 27, 1998, 18 pp. http://www.im.lcs.mit.edu/bh/bh–paper1.html.

Pioneer Rocketplane, "Pioneer Rocketplane Successfully Completes Bantam Contract," Oct. 27, 1998, 1 p. http://www.rocketplane.com/Latest.html.

Pioneer Rocketplane, "The Initial Product: The Pathfinder Spaceplane," Oct. 27, 1998, 1 p. http://www.rocketplane.com/RocketplaneSystem.html.

Pioneer Rocketplane, "Frequently Asked Questions," Oct. 27, 1998, 2 pp. http://www.rocketplane.com/FAQ.html.

(List continued on next page.)

*Primary Examiner*—Charles T. Jordan
*Assistant Examiner*—Tien Dinh
*Attorney, Agent, or Firm*—Christie, Parker & Hale, LLP

[57] ABSTRACT

An orbital launch vehicle equipped with aerodynamic lifting surfaces is towed as a glider behind a conventional aircraft. The launch vehicle is used to place spacecraft into low earth orbit. The lift from the aerodynamic surfaces enables the launch vehicle to be towed by means of a flexible cable from a conventional runway using existing aircraft. As with "conventional air-launch," this permits spacecraft launch into orbit to originate from any conventional runway consistent with constraints of public safety, thus eliminating the need to build dedicated launch pads at geographic locations from which a full range of orbital inclinations can be reached. The method of towing the launch vehicle, utilizing the lift of its wings to fully offset its weight, permits at least an order of magnitude increase in the weight of vehicle which can be launched compared to "conventional air-launch" methods whereby the launch vehicle is carried on, or within a conventional aircraft. This in turn enables an order of magnitude increase in the weight of spacecraft which can benefit from the inherent flexibility and low cost of "air-launch." The tow launch method also requires fewer and simpler modifications to a conventional aircraft than do any other current or proposed air-launch methods.

40 Claims, 5 Drawing Sheets

6,029,928

U.S. PATENT DOCUMENTS

| | | |
|---|---|---|
| 2,477,569 | 8/1949 | Beirise ............................................. 244/3 |
| 2,649,262 | 8/1953 | Fahrney ........................................... 244/3 |
| 2,723,812 | 11/1955 | Hohmann ........................................ 244/3 |
| 2,774,547 | 12/1956 | Latimer-Needham et al. ............ 244/3 |
| 2,823,880 | 2/1958 | Bergeson ................................. 244/135 C |
| 3,437,285 | 4/1969 | Manfredi et al. ........................... 244/63 |
| 3,747,873 | 7/1973 | Layer et al. .................................. 244/3 |
| 4,235,399 | 11/1980 | Shorey ..................................... 244/129.5 |
| 4,265,416 | 5/1981 | Jackson et al. ............................ 244/63 |
| 4,646,994 | 3/1987 | Peterson et al. . |
| 4,784,354 | 11/1988 | Iavano .................................. 244/135 B |
| 4,802,639 | 2/1989 | Hardy et al. . |
| 5,255,873 | 10/1993 | Nelson ........................................ 244/63 |

OTHER PUBLICATIONS

Talmage, Jr., "Space Transportation Vehicle," TMS, Atlanta, Georgia, 4pp.

"Rival to the Orient Express?" *Design News*, vol. 43, No. 7, Apr. 6, 1987, p. 37.

"The Space Transporation Vehicle," *Selection of Engineering Materials*, Prentice Hall, Englewood Cliffs, New Jersey, 1990, pp. 439–440.

"Private Affordable Space Planes," *OMNI*, vol. 9, No. 3, Dec. 1986, p. 157.

SPACE LAUNCH VEHICLES CONFIGURED AS GLIDERS AND TOWED TO LAUNCH ALTITUDE BY CONVENTIONAL AIRCRAFT

This application is a cip of Ser. No. 08/342,596 filed Nov. 21, 1994 U.S. Pat. No. 5,626,310.

BACKGROUND OF THE INVENTION

This invention relates generally to launch vehicles for placing spacecraft into orbit around the earth and, more particularly, to launch vehicles equipped with lift producing surfaces of sufficient capacity to permit the launch vehicles to be towed as gliders behind conventional aircraft. A launch vehicle so configured may be regarded as "air-launched" by conventional aircraft, or, alternatively as a launch vehicle augmented by a conventional aircraft which serves as a "zero-stage."

A limited number of differing types of launch vehicles is currently available for placing spacecraft into orbit around the earth. Virtually all are launched under rocket power from a fixed launch pad. This limits the rapidity with which launches can be performed to the time required to prepare the launch pad, assemble the launch vehicle on the pad, place the spacecraft on the vehicle, load propellant into the vehicle, verify that its systems are operating properly, and perform the launch. When the requirement arises to place a spacecraft into a specific orbital plane with respect to the fixed stars, the opportunity to launch is limited to a very short time as the orbital plane passes over the launch site. This time, referred to as the launch window, can be as short as a few seconds if the desired orbital plane is highly inclined to the equator and the launch pad is at a low latitude. If any operation leading up to launch is delayed, the launch window may be missed, and the launch may have to be delayed until the next opportunity. The complexity of launch operations is often such that the next passage of the desired orbital plane occurs before the vehicle can be made ready for another attempt. Maintaining a launch crew on site and repeatedly performing pre-launch operations is a significant contributor to the high cost of space launch operations.

Pad-launched vehicles can deliver spacecraft only to certain orbital inclinations by virtue of the geographic location of the launch pad. Safety concerns related to flying over inhabited land masses restrict the direction in which a vehicle can be launched from a given pad, and consequently limit the maximum inclination of the orbit which can be achieved. The minimum inclination which can be achieved from a fixed launch pad is determined by and equal to the geographic latitude at which the pad is situated. Though propulsive maneuvers can be performed to change orbital inclination once the spacecraft is in orbit, the weight of propellant required to do so is prohibitive for changes greater than 5 or so degrees.

Launch pad construction is very costly, as is launch pad maintenance and post-launch refurbishment. These costs are reflected in the cost of launch. The nature of the earth's geography is such that only a small number of remote locations, at the equator, are suitable for launching into orbits of arbitrary inclination. For launch service providers who do not have access to these locations, multiple launch sites at various locations must be built in order to be able to place spacecraft into orbits of arbitrary inclination. The cost of multiple launch sites can be prohibitive, so that launch service providers are unable to afford enough sites to launch into orbits of arbitrary inclination. This results in a restriction of the types of missions that can be performed by a given launch service provider.

A recently implemented improvement in space launch has emerged wherein the launch vehicle is carried on board a conventional aircraft. The aircraft can fly to an arbitrary geographic location, where the launch vehicle is released and propels its payload (spacecraft) into orbit. This operation is referred to as "air-launch," and vehicles so configured as "air-launched."

An alternative way of regarding air-launch, appropriate when applied to launch vehicles capable of taking off from the ground, is to consider the launch aircraft as a "zero-stage." This parlance is commonly used to describe propulsion systems added to existing launch vehicles to augment their performance by raising them to a certain altitude and velocity before the launch vehicle's own propulsion system can be ignited. This reduces the total energy the existing launch vehicle must add to the payload, and translates into either greater payload capacity or into placing the same payload into a more energetic orbit. Reference to the launch aircraft as a "zero-stage" would apply in cases where the launch vehicle is either capable of taking off from the ground under its own power, or where the launch vehicle was not specifically designed to be air-launched.

The advantages of air-launch over ground-launch are numerous. The launch location can be selected so that no inhabited land mass is jeopardized by the vehicle as it flies over, yet the spacecraft can be placed into an orbit of any desired inclination. The variety of missions which can be performed using this aircraft as a launch platform is thus significantly greater than that which can be performed by a vehicle launched from a fixed pad. Moreover, only one aircraft need be purchased, and it can be flown from any conventional airport facility which will permit such operation. This is equivalent to having one "launch pad" (the aircraft) which can be easily moved to any desired geographic location. In the alternative representation of such a system as a launch vehicle having an aircraft as a zero-stage, the equivalence becomes one of having multiple launch pads already in place around the world in the form of the above mentioned conventional airport facilities.

Also, when launching into specific, highly inclined orbits, the aircraft launched vehicle can have a launch window whose duration is limited only by the time the aircraft can remain aloft. This can be accomplished by flying westward at a latitude and speed which permit the aircraft to keep pace with the orbital plane as the earth rotates beneath it. The chances of missing a launch window are thereby significantly reduced.

As mentioned previously, the launch vehicle has to add less potential energy to the spacecraft, since it begins its powered flight at a higher altitude than does a vehicle launched from a ground-based pad. The velocity of the aircraft is also added to that of the launch vehicle, so that the launch vehicle does not have to provide all of the velocity needed to reach orbit. If the launch vehicle is rocket propelled, the performance of the rocket engine can be higher than if it is launched from the ground due to the lower back-pressure on the nozzle at the launch altitude.

Finally, for a given orbital inclination, the launch vehicle may be launched in a due-east direction from a latitude equal to the desired orbital inclination. This adds the velocity of the earth's rotation to the vehicle's initial velocity to the maximum extent possible. These factors all contribute to a vehicle which, for a given launch weight, can place a heavier spacecraft into orbit than it could if launched from the ground, or the same payload into more energetic trajectories.

Even more performance enhancement is gained by adding lifting surfaces to the vehicle. These use aerodynamic forces to augment the thrust produced by the launch vehicle's propulsion system, effectively offsetting the performance loss usually incurred by the propulsion system having to first offset the vehicle's weight before actually providing acceleration.

The sole current aircraft-launched system (Orbital Sciences Corporation's Pegasus™) has wing surface area only sufficient to partially offset the vehicle's weight at the speed of the launch aircraft. As the vehicle accelerates and, at the same time, becomes lighter by virtue of expending propellant, the wing eventually becomes capable of overcoming the vehicle weight. The performance enhancement potentially available from the wing is hence limited.

The Pegasus™ is carried by its launch aircraft, by direct attachment either to an underwing pylon or a special fitting beneath the aircraft fuselage. Other proposed launch vehicles which are intended to be launched by an aircraft are all designed to be carried by the aircraft in some fashion, either on top of the aircraft, under the wing, or inside the cargo compartment. Some use lifting surfaces, others do not, but in no case is there a design wherein the launch vehicle has aerodynamic lift equal to or greater than the vehicle's launch weight at an indicated airspeed equal to that of the launch aircraft.

Each of these launch vehicles suffers from the same set of deficiencies. First, the maximum weight of the launch vehicle is limited to the weight that the carrier aircraft can safely lift to the required altitude. This places an absolute upper limit on the size and weight of the spacecraft which can be launched by such launch vehicles. The weight limit is not necessarily equal to the cargo capacity of the carrier aircraft. If the launch vehicle is mounted externally to the aircraft, the interference drag added to aircraft by the addition of such appendage will require extra power to overcome. In addition, the structural loads imposed on the aircraft are greater than just the weight of the launch vehicle. The drag force on the launch vehicle and inertial load factors add significantly to the loads applied to the carrier aircraft. A structural limit may be reached long before the actual weight-lifting capacity of the aircraft has been exceeded.

Second, there is risk associated with carrying the launch vehicle, which typically contains large amounts of explosive propellant, on or in a manned launch aircraft. Explosive hazards are reasonably small during flight from the runway to the launch point. The greatest potential for explosion is during or shortly after ignition of the launch vehicle's propulsion system. Partly for this reason, most air-launch concepts require the launch vehicle to fall freely from the carrier aircraft before their propulsion system is started. This reduces the achievable reliability somewhat, in that the launch vehicle is irrevocably separated from its carrier aircraft before it is known with certainty that its propulsion system is functioning properly. There can also be a net loss of performance compared to ground launch if the launch vehicle has no lifting surfaces, and acquires significant speed during free-fall.

Third, the separation of the launch vehicle from the aircraft can introduce dynamic loads to the launch vehicle which are in turn transmitted to the spacecraft. These loads can be very severe, and require a heavier spacecraft structure than might otherwise be needed.

Fourth, externally-carried launch vehicles are subjected to the noise from the carrier aircraft's engines, and to noise generated by the complex air flow around the launch vehicle if it projects into the freestream. This imposes random vibration on the spacecraft. Vibration levels can be higher than those imposed on a spacecraft on a vehicle launched from a ground-based pad, and last hundreds of times longer. Again, a heavier spacecraft structure may be required, and delicate instruments may have to be completely redesigned to survive.

Fifth, the cost and complexity of modifications to the carrier aircraft permitting it to carry the launch vehicle increase dramatically with launch vehicle size. In fact, such modifications may become more complex and expensive than building a launch pad, reducing the incentive to utilize aircraft launch.

Finally, there is a risk to the aircraft crew from a multitude of failures which can occur when separating a launch vehicle from the aircraft. As one example, the launch vehicle control system may fail resulting in collision with the carrier aircraft and loss of both.

While launching of space launch vehicles from aircraft has significant advantages over ground-launch, the limitations associated with current designs are significant. Most important is the limitation on spacecraft size and weight imposed by current technology. In order to more fully realize the advantages of aircraft launch of space launch vehicles, as well as reduce its cost, risks, and other limitations, a new approach is desired.

SUMMARY OF THE INVENTION

The present invention overcomes the deficiencies of current aircraft-launched space launch vehicle technology through the application of glider technology to the launch vehicle. Simply stated, this consists of adding lifting surfaces to the launch vehicle which are capable of overcoming the vehicle's launch weight at speeds less than or equal to the takeoff speed of a conventional aircraft. The launch vehicle may then be towed, using a flexible cable, behind a conventional aircraft. The launch vehicle, in tow, can then be flown to any desired geographic location in exactly the same manner as a launch vehicle carried on or inside of an aircraft. At the launch point, the tow line can be released and the launch vehicle's propulsion system started in a safe, stable manner, and propel the vehicle's payload into orbit.

The invention consists either of a glider airframe with one or more propulsive stages incorporated into it, or alternatively of a launch vehicle of one or more propulsive stages to which suitable lifting surfaces have been appended. The vehicle can be either completely expendable, partially reusable, or completely reusable depending on the specific vehicle requirements. It may be equipped with landing gear in order to permit it to be recovered in the event of inability to launch. In any embodiment, it is equipped with attachment points and release mechanisms for the tow line, and a control system which permits it fly either autonomously or under remote control.

Although not necessary, ground handling and takeoff may be accomplished by mounting the vehicle on a carriage equipped with wheels and a braking system capable of stopping the vehicle safely in the event of an aborted takeoff. The carriage would be left on the ground to save weight, and would use its integral braking system to stop automatically once the launch vehicle has lifted off.

The tow aircraft contributes only thrust, not lift, to the launch vehicle. The total engine thrust available from a commercial wide-body transport jet's engines is far in excess of the aircraft's drag. The difference between engine thrust an aircraft drag can be directly applied to the launch vehicle, which reacts the applied load with its own drag force. The maximum weight of the glider is then limited only by its lift-to-drag ratio (L/D), and is roughly equal to the applied tow load multiplied by the L/D. To give a specific example, the 747-200B at cruise may have a total available thrust of 67,500 pounds force at 36,000 feet cruise altitude. If the 747 weighs 500,000 pounds, and its L/D is 12, the drag force on it at equilibrium cruise is 41,667 pounds, leaving 25,900 pounds net force to apply to the tow cable. If the launch vehicle has an L/D of 10, its maximum weight can then be 259,000 pounds. By contrast, the maximum weight which can be carried on the aircraft's available structural hard points (which are used for transporting spare engines) is 50,000 pounds.

An implication of the above is that far fewer structural modifications need to be made to an aircraft to enable it to tow a heavy load than to carry a light load. In the example given, a 259,000 pound launch vehicle could be towed behind an aircraft and exert a force on the aircraft of only 25,900 pounds. Yet existing hard points on the aircraft are already capable of reacting 50,000 pounds of force.

From the perspective of the launch vehicle, being towed relieves it of the need to carry heavy propulsion systems or fuel to carry it from the runway to the point of powered boost ascent. This simplifies the launch vehicle, and effectively transfers the burden of getting from the takeoff point to the point of powered ascent initiation to the tow aircraft in the same manner as a launch vehicle carried aboard an aircraft.

Since the launch vehicle is equipped with wings which permit it to take off at aircraft speeds, it could obviously take off from the ground under its own power. Its performance would be reduced, however, since it would have to overcome more drag, gravity, and back-pressure losses. This is an instance where the use of the term "zero-stage" for the tow aircraft is appropriate. The method of attaching the launch vehicle and zero-stage together, via flexible cable, is made possible by the aerodynamic lift capability of the launch vehicle, and constitutes a significant advance in the state of the art for launch vehicles.

Other advantages accrue from the use of high aerodynamic lift of the type described above. The use of high-lift devices in launch vehicles permits them to perform in a manner not possible to low-lift vehicles such as Pegasus™. Low-lift vehicles must have high thrust in order to minimize their performance loss due to overcoming gravity. For a given amount of propellant, the duration of thrust is inversely proportional to the thrust level. High thrust means short burn times, which cause the vehicle to reach relatively high speeds at relatively low altitudes. This imposes a performance loss due to drag that would not otherwise occur.

A high-lift vehicle can climb at a shallower angle for a longer period of time, since it is supported entirely aerodynamically. Thrust is required only to acquire or maintain speed, unlike the case of a low-lift vehicle which requires significant additional thrust to offset the vehicle's weight. The high-lift vehicle, burning the same amount of propellant, can climb to higher altitude before acquiring significant speed than can a low-lift vehicle, reducing the drag penalty. Having such significant force available on demand can also aid in shaping the trajectory to minimize gravity losses, and even in changing the flight azimuth after significant speed has been acquired, without an attendant loss of performance.

At the end of the flight, if the glider is to be recovered, high-lift can work to reduce heat loading on the vehicle, and extend its range. Once the first-stage propellant has been expended, the vehicle's wing loading is so low compared to its takeoff value that heating and maneuvering loads are much more benign than would be possible with a low-lift vehicle.

The high-lift aspect intrinsic to the towed-glider launch vehicle sets it apart from all other air-launched or aerodynamically assisted concepts. It operates in a different flight regime than low-lift vehicles, one that has several advantages. There are also numerous practical benefits which accrue from the towed-glider launch vehicle, such as the above-mentioned simplification of aircraft modifications.

BRIEF DESCRIPTION OF THE DRAWINGS

FIGS. 1A–1D show one embodiment of a launch vehicle of the type described herein.

DETAILED DESCRIPTION

One embodiment of the invention, in FIG. 1, shows a glider airframe [1] equipped with wings [2] and rudder [3], into which a rocket propulsion system is incorporated, as indicated by the nozzle [4] projecting from the aft end. FIG. 1-A is a planform view, showing a cranked-delta wing configuration. This wing configuration was chosen to give an optimum balance between subsonic lift-to-drag ratio and hypersonic drag, allowing the maximum weight to be towed behind a conventional aircraft while imposing the least drag penalty at high speeds. Other planforms, including variable-sweep and X-wing configurations would be equally suitable.

FIG. 1-B shows the vehicle in side view, with the rudder [3] more clearly indicated. FIGS. 1-C and 1-D illustrate one possible implementation of a means of loading and deploying the upper stages and spacecraft, through the use of an articulating nose door [5]. This arrangement is similar to cargo doors on conventional nose-loading freighter aircraft, such as the 747-100F and the C-5A Galaxy. FIG. 1-C shows the door partially opened, and FIG. 1-D shows it fully opened.

FIG. 2-A shows the vehicle in section, illustrating the integrated propulsion stem [6 through 9], the bay for upper stages and spacecraft [10], and a structural interface for the upper stages and payload [11]. The tank located in the nose [6] would hold liquid oxygen (LOX) in this embodiment, as would the aftmost tank [8]. The center tank [7] would hold kerosene. This arrangement was chosen to permit transfer of propellant along the length of the vehicle in such a manner as to keep the vehicle center of gravity ahead of its center of pressure through all flight regimes. During the transition from subsonic to supersonic flight, the center of pressure moves forward significantly. If the center of gravity is not kept in a certain relation to the center of pressure, the vehicle becomes unstable. By depleting the LOX in tank [8] first, the center of gravity can be made to travel forward as propellant is expended. In an abort situation, wherein the engine [9] shuts down, the vehicle will decelerate. The accompanying aftward shift in the center of pressure location can be compensated by transferring residual LOX from the forward tank [6] to the aft tank [8], thus maintaining a stable relationship of center of pressure and center of gravity locations.

FIG. 2-B shows the components of the upper stage and spacecraft assembly. A large solid propellant motor [12] serves as the second stage of the launch vehicle. A small solid propellant motor [13] serves as the third and final stage. The two motors are joined by a truss or other structural assembly [14]. A spacecraft [15] can then be joined to the third stage resulting in the integrated spacecraft and upper stage assembly [16] shown in FIG. 2-C. This assembly is then installed in the first stage as shown in FIG. 2-D. During ground operations, the integrated assembly of upper stages and spacecraft can be loaded into the launch vehicle horizontally, through the open nose door, eliminating the need for cranes or other heavy-lift equipment normally associated with pad-launched launch vehicles. This represents a considerable saving in equipment cost, and in the complexity and time required to perform pre-flight assembly. Since the liquid propellants for the launch vehicle would not be loaded until just before takeoff, the nose tank [6] will be empty during the loading operation of the spacecraft and upper stage assembly [16], so that the hinge structure and opening mechanisms need not be excessively strong and heavy.

Figure 1A:
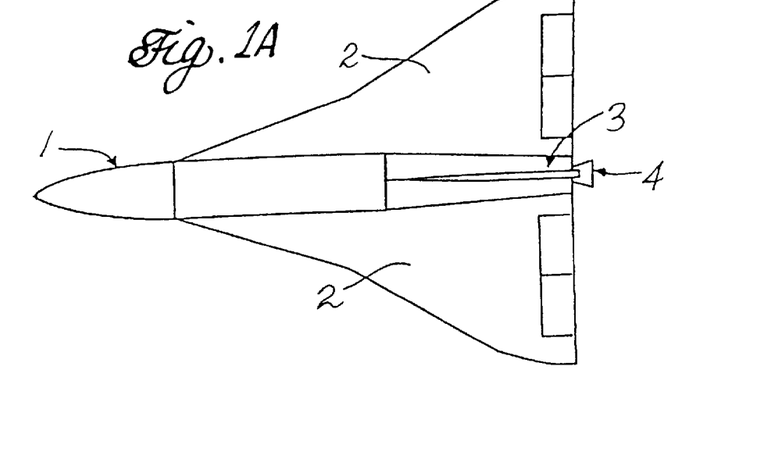
FIG. 1A is a planform view, FIG. 1B a side view.
Figure 1B:
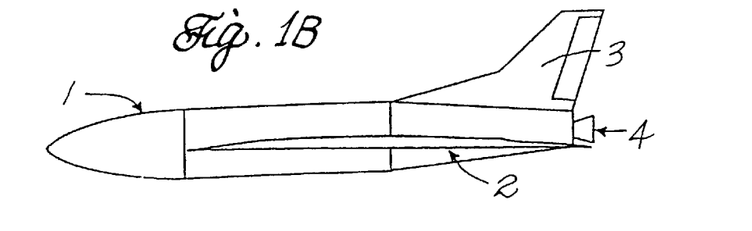
Figure 1C:
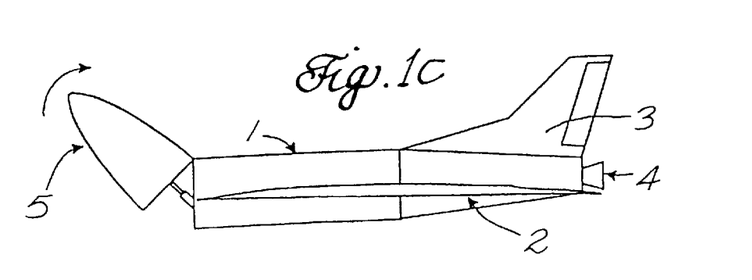
FIGS. 1C and 1D are side views illustrating the operation of an articulating nose door.
Figure 1D:
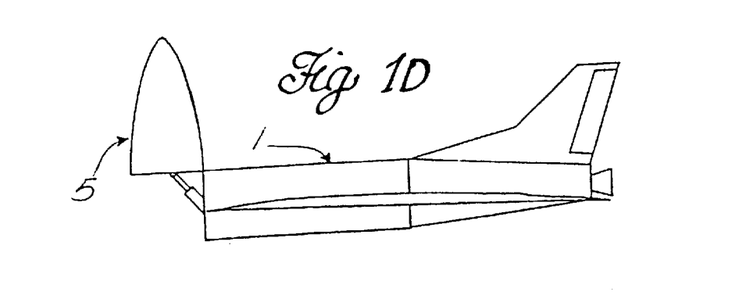
Figure 2A:
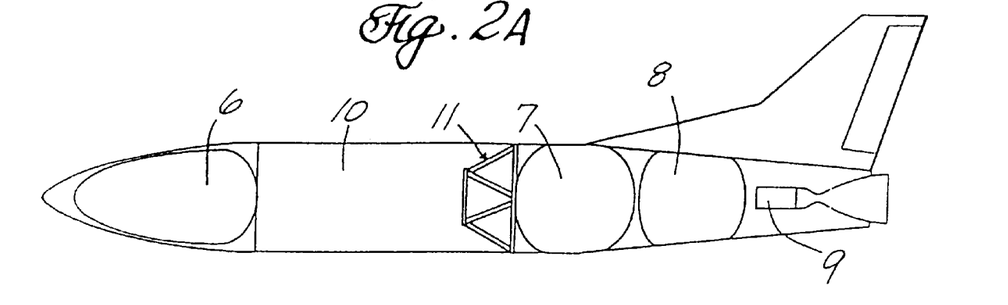
FIGS. 2A–2D illustrate the layout of the propulsion systems in this embodiment of the launch vehicle.
Figure 2B:
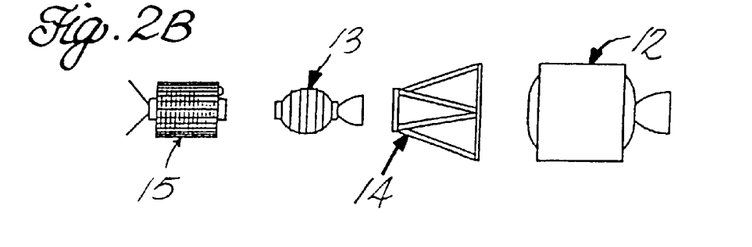
Figure 2C:
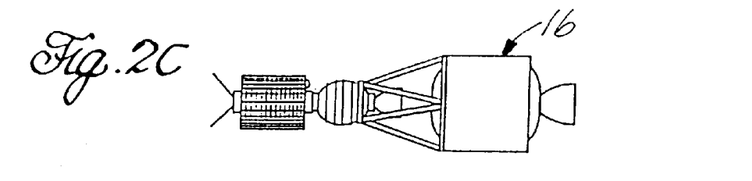
Figure 2D:
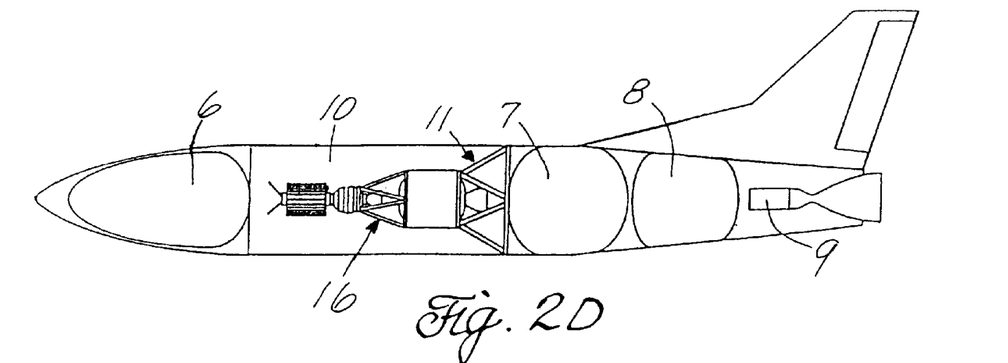
Figure 3A:
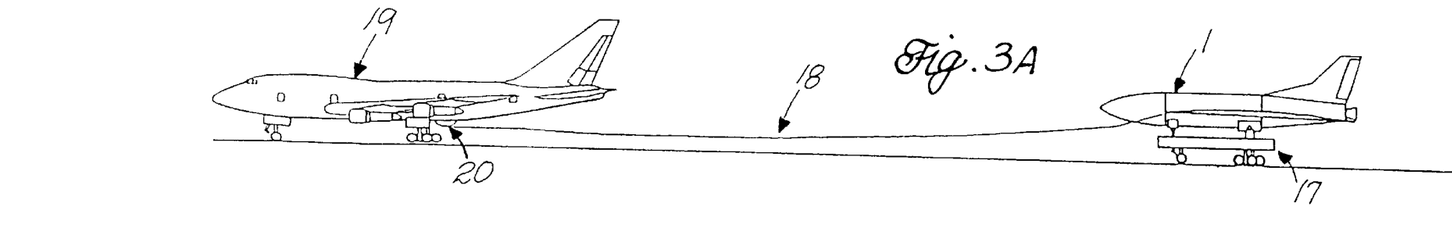
FIGS. 3A–3D illustrate the takeoff sequence for the launch vehicle and tow aircraft.
Figures 3B, 3C:
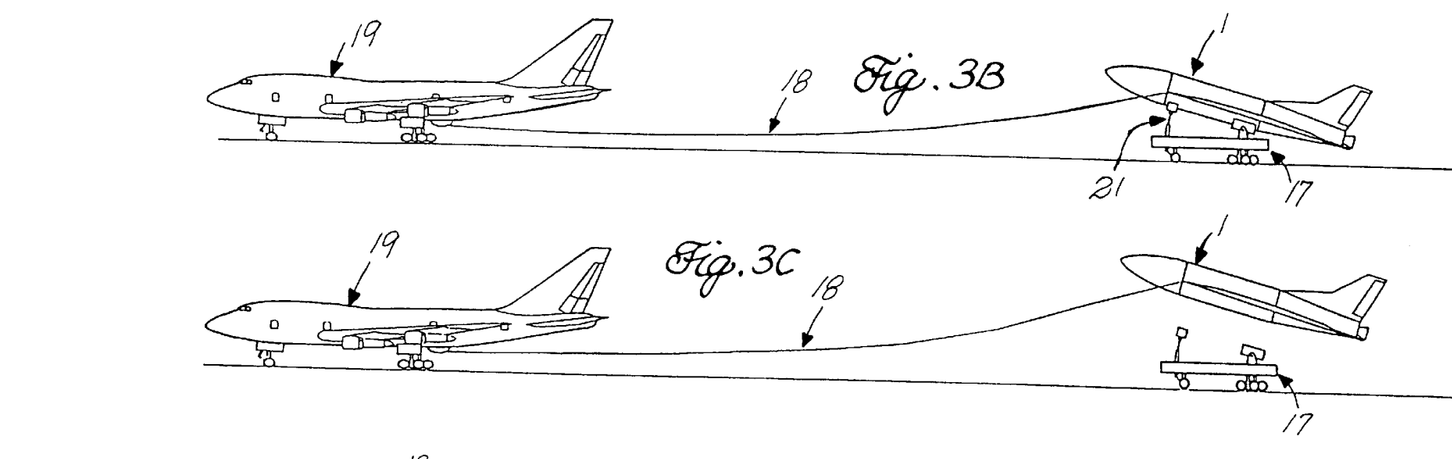
Figure 3D:
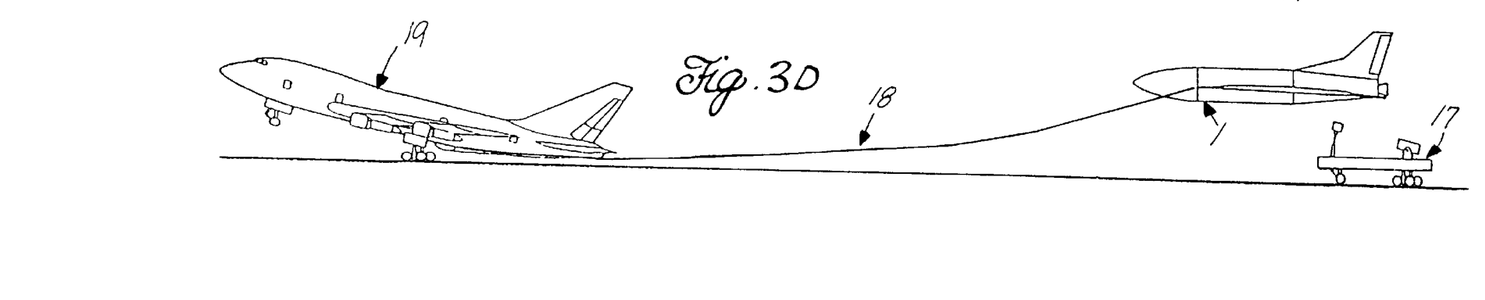

Preferably, all ground operations would be performed with the launch vehicle mounted to its handling and takeoff cart [17], as shown in FIGS. 3-A through 3-D. Mechanical attachment of the vehicle [1] to the cart [17] would be accomplished by the use of explosive bolts, or some other mechanism which would securely fasten the two together, yet which could be released on command. The launch vehicle would be coupled to the tow aircraft by a flexible cable [18]. This cable would have suitable attachment and release mechanisms located on the launch vehicle [1], and would be attached to the tow aircraft [19] through a winch mechanism mounted in a fairing [20] at or near the tow aircraft's center of gravity. This is done to minimize the overturning moments which would be applied to the aircraft by the tow line. As it would become apparent to one skilled in the art, the invention can be practiced without use of cart [17] if the launch vehicle is equipped with wheels or skids.

FIG. 3-A shows the assembly during takeoff roll. Both vehicles remain on the ground until the tow aircraft has passed its rotation speed, which is the speed needed to take off. Current flight practices required jet aircraft to take off after this speed has been reached, even if a serious mechanical problem arises with the aircraft. At this point, as shown in FIG. 3-B, a hydraulic ram [21] on the carriage extends to lift the nose of the launch vehicle to its takeoff angle. The mechanical linkage between the carriage and the launch vehicle is then severed, and the launch vehicle takes off as shown in FIG. 3-C. When the launch vehicle has reached a suitable altitude, the tow aircraft can then rotate for take off as shown in FIG. 3-D.

There are two reasons for this takeoff procedure. First is that once the launch vehicle becomes airborne, the tow aircraft must also take off even if it has developed a problem which will not permit it to continue the mission. In such a situation, propellant can be jettisoned rapidly from the launch vehicle to lighten its weight for subsequent recovery. The tow aircraft can execute a turn to bring it back to the runway for emergency landing, and the two vehicles can be recovered without incident for future flight attempts.

The second reason for having the launch vehicle airborne first is to ensure that it is out of reach of the strong wing-tip vortices which develop when a large aircraft takes off, or otherwise flies at a high angle of attack. During ascent to the launch point, the launch vehicle continues to fly above the tow aircraft to avoid these vortices.

In another embodiment, the launch vehicle has a takeoff airspeed greater than the takeoff airspeed of the tow aircraft. With this embodiment, the tow aircraft takes off first and attains level flight over the runway until the launch vehicle which is being remotely controlled from the tow aircraft, takes off. After the launch vehicle takes off, the tow aircraft begins its ascent. Since the tow aircraft will take off before the launch vehicle, it is preferred that the launch vehicle be far enough behind the tow aircraft so as to be outside of the tow aircraft's wake turbulence.

As such, the present invention can be practiced with a launch vehicle which is capable of maintaining flight while being towed and which can take off at airspeeds greater than, equal to, or less than the takeoff airspeed of the tow aircraft.

While with any of the aforementioned embodiments it is preferred that the launch vehicle its towed at a level higher than the tow aircraft so as to be outside of the tow aircraft's wake turbulence, the launch vehicle can also be towed at a level lower than the tow aircraft and remain outside of the tow aircraft's wake. During flight, the launch aircraft can move, if desired from the low to high tow and visa versa.

The launch vehicle is towed to a the desired launch location, during which transport time the necessary preflight checks are performed telemetrically through a launch console located in the tow aircraft. The launch vehicle is also piloted remotely, by a pilot located in the tow aircraft and using standard Remotely Piloted Vehicle (RPV) control technologies. Once at the desired launch location, the first stage rocket engine is ignited, and once its operation has been verified, the tow line is cast off from the launch vehicle.

The length of the tow line used to tow the launch vehicle may be adjusted. The tow line is kept relatively short during takeoff so as to minimize the amount of runway required for takeoff. The length of the line may be increased, (i.e., more line may be released from the tow aircraft) so as to maximize the distance between the tow aircraft and the launch vehicle prior to ignition of the launch vehicle engine.

The launch vehicle climbs to a suitable altitude and velocity, then enters coasting flight. In the embodiment shown, the first stage propellants are exhausted at an altitude of approximately 350,000 feet and a velocity of 14,000 feet per second. The flight path angle at first stage shutdown is such that it can coast to 600,000 feet or more. Once the vehicle has coasted above 400,000 feet, it is out of the sensible atmosphere. Aerodynamic forces and free molecular heating are no longer a concern, and the articulating nose door may be opened for deployment of the spacecraft and upper stage assembly.

Figure 4A:
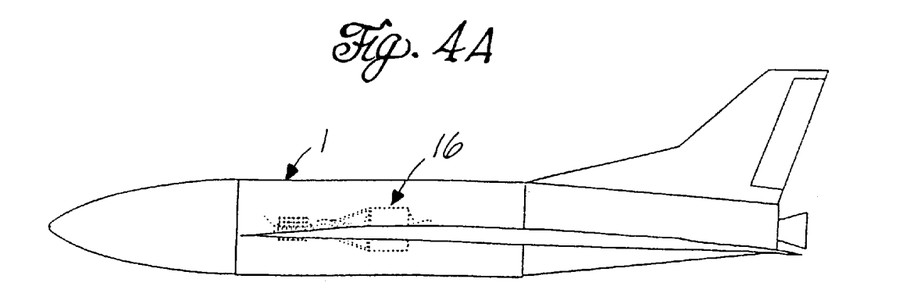
FIGS. 4A–4C illustrate the method of separating the upper stages from the first stage in this embodiment of the launch vehicle.
Figure 4B:
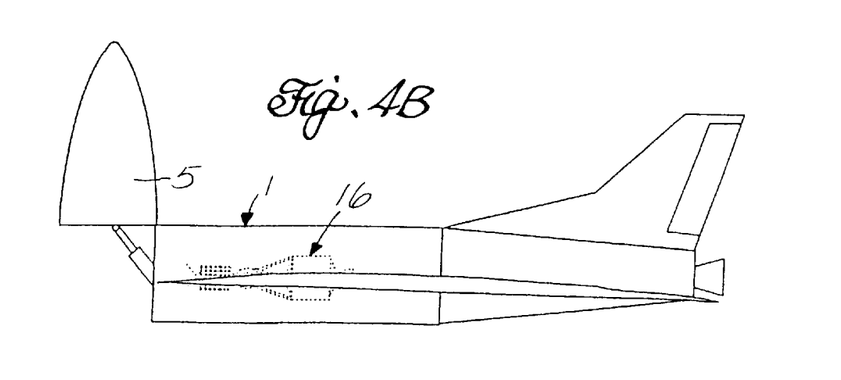
Figure 4C:
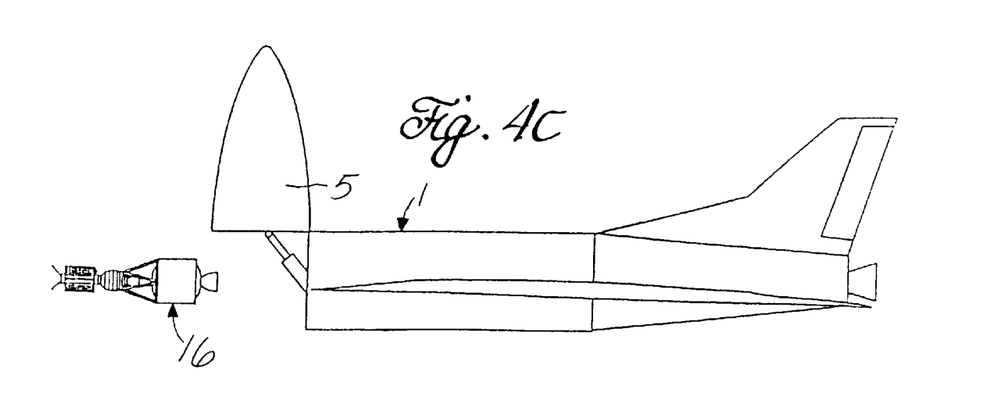
Figure 5:
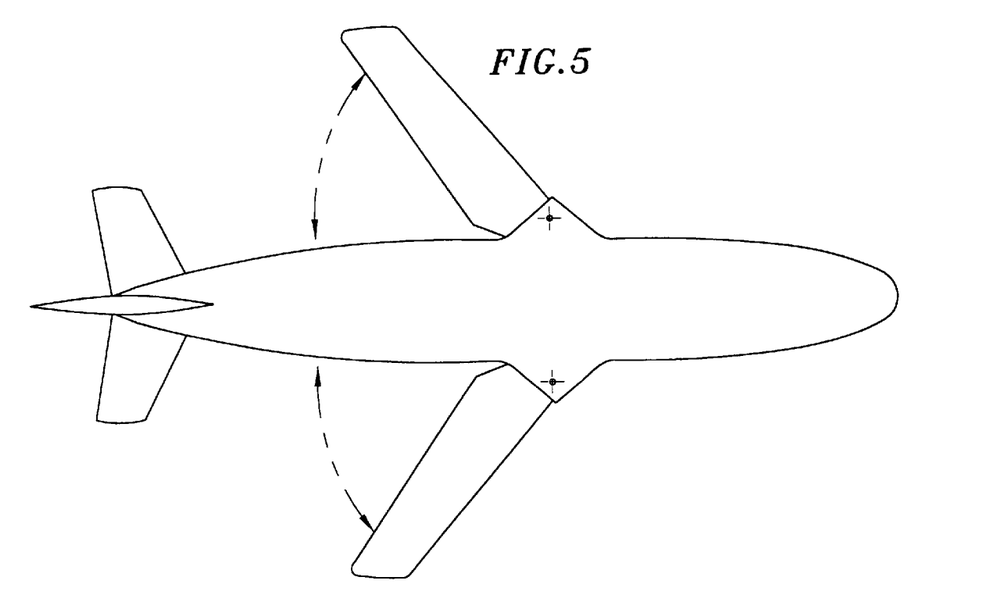
FIG. 5 illustrates a top view of a launch vehicle of the present invention having a variable-sweep wing configuration.
Figure 6:
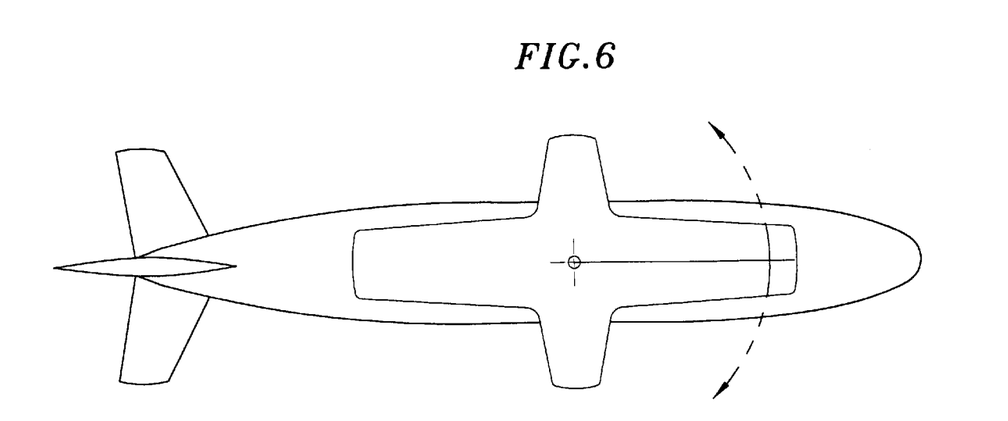
FIG. 6 illustrates a top view of a launch vehicle of the present invention having an X-wing configuration.

FIGS. 4-A through 4-C illustrates separation of the first stage from the spacecraft and upper stage assembly during flight. In FIG. 4-A, the vehicle is in coasting flight. In FIG. 4-B, the nose door is shown in the open position. In FIG. 4-C, the spacecraft and upper stage assembly is shown after being ejected from the first stage. This can be accomplished using qualified spring separation mechanisms, hydraulic rams, or other suitable actuators.

Once separated, the spacecraft and upper stage assembly coasts to a distance from the first stage to avoid damage to the latter from jet impingement. The second and third stage motors then fire in sequence to place the spacecraft into orbit. The door on the glider would then be closed, and the glider would reenter the atmosphere for subsequent gliding flight to a recovery landing field.

This is the preferred embodiment for initial development, because it represents the most cost-effective solution in terms of initial and operational cost. Commercially available expendable upper stages may be used, requiring no development cost. The recoverable rocket-propelled glider is readily developed using existing airframe and propulsion technologies. Guidance and navigation systems are commercially available for controlling the vehicle through all flight regimes, including automated landing of the first stage and orbital injection of the third stage.

A liquid propulsion system is preferred in a recoverable rocket, since it is more readily refurbished and refueled than either a solid or hybrid rocket system. System safety is also enhanced, since in an aborted flight situation, liquid propellants can be jettisoned from the vehicle to lighten it for landing and reduce explosive hazard. This cannot be done with solid propellant motors, and is only partly possible with hybrids. However, the invention does not depend upon any specific propulsion technology. Its advantages are independent of the types of propulsion systems used, and selection of the types of systems need depend only on a given set of requirements. In the preferred embodiment, the primary objective is to reduce the cost of space launch, and the selection of propulsion systems reflects that fundamental objective.

An advantage of liquid or hybrid propulsion systems is the ability to vary thrust level at will. This permits taking full advantage of the ability to minimize gravity losses by climbing at shallow angles for extended periods of time, in that throttling back the engine or engines conserves propellant. Bipropellant liquid propulsion systems entail additional safety risk compared to hybrids due to the presence of two liquids. However, the tankage for liquid propulsion systems can be distributed through the launch vehicle in a manner which makes best use of available volume, and permits control of the location of the vehicle center of gravity.

During tow, the distance between the launch vehicle and tow aircraft can be varied using a winch mechanism. By controlling the separation of the tow aircraft and launch vehicle, random vibration imposed on the spacecraft from the aircraft engine noise and aerodynamic buffeting from the tow aircraft wake can be minimized. This is in sharp contrast to other external-carry air launch concepts, in which engine and aerodynamic noise can impose more severe vibration environments on the spacecraft than the reflected rocket noise of a launch vehicle as it takes off from a ground-based pad.

The launch vehicle can also be positioned far enough behind and above the tow aircraft to permit ignition of the launch vehicle's propulsion system while the tow line is still connected, without endangering the crew of the tow aircraft. This provides enhanced reliability for the launch system, since proper operation of the launch vehicle's engine can be verified prior to irrevocable severing of the tow line. If the launch vehicle's propulsion system fails to start properly, it can be shut down and the tow aircraft and launch vehicle returned to the launch site safely. Even in the event of a catastrophic failure of the launch vehicle upon propulsion system ignition, the tow aircraft can be far enough away to prevent damage from explosive overpressure or shrapnel impact. The fact that the relative wind blows from the tow aircraft toward the launch vehicle at hundreds of miles per hour enhances the safety of the tow aircraft.

Use of expendable upper stages simplifies the development of the vehicle in this embodiment in other respects. By placing half of the propulsive burden on motors which are commercially available, it requires no extensive development of upper stages. More importantly, however, it simplifies the task of protecting the recoverable first stage from aerodynamic heating during ascent and, especially, during reentry.

During ascent, the rocket-powered glider does not achieve sufficient velocity within the sensible atmosphere to make aerodynamic heating an intractable problem. Use of throttling in the first stage propulsion system simplifies the problem further, since low speeds can be maintained without penalty for extended periods of time. This allows the vehicle to climb to a sufficient altitude to permit it to throttle up and "dash" through the hypersonic portion of flight in a relatively short time.

Reentry heating is significantly less for this glider than that experienced by a vehicle entering the atmosphere from orbit, for two reasons. The first is that the maximum velocity of the first stage need never exceed half of that required to achieve orbit. This in turn means that the vehicle has to dissipate no more than 25% of the energy possessed by an orbiting body in order to slow down to subsonic flight speed. Also, the weight of the glider on takeoff must be between three and five times that of its weight after expending its propellant. The wing-loading of the glider is thus one-third to one-fifth of its takeoff value. This permits energy to be dissipated over a larger area, resulting in lower heat transfer rates to the vehicle structure. Heating loads may thus be accommodated by application of simple, durable insulation materials over most of the structure, and refractory materials in stagnation regions.

Overall, this embodiment represents the best balance of development cost and risk and operational cost and risk of any near-term system whose primary objective is to minimize cost and risk. Other implementations are possible, employing other types of propulsion systems, including airbreathing systems, in the glider, and recoverable upper stages. The embodiment described herein is preferred mainly due to the fact that it does not tax the state of the art in aircraft or launch vehicles, but combines elements of both in a simple fashion which nonetheless results in a significant advance in the state of the art.

What is claimed is:

1. A towed glider space launch vehicle for deploying a spacecraft, the glider adapted to be towed by an aircraft and comprising:
   aerodynamic lifting surfaces capable of providing all of the lift required to support atmospheric flight of the vehicle for lifting the vehicle to a predetermined launch altitude while being towed by the aircraft at subsonic speeds;
   a support for carrying the spacecraft; and
   a rocket propulsion system for increasing the velocity of the vehicle.

2. A towed glider space launch vehicle as recited in claim 1 wherein the aerodynamic lifting surfaces are capable of supporting atmospheric flight of the vehicle at an airspeed equal to the takeoff speed of the tow aircraft.

3. A towed glider space launch vehicle as recited in claim 1 wherein the vehicle has a takeoff speed greater than the takeoff speed of the tow aircraft.

4. A towed glider space launch vehicle as recited in claim 1 wherein the aerodynamic lifting surfaces are capable of supporting atmospheric flight of the vehicle at an airspeed less than the takeoff speed of the tow aircraft.

5. A towed glider space launch vehicle as recited in claim 1 wherein the propulsion system propels the vehicle to an altitude from which the vehicle can coast beyond the atmosphere.

6. A towed glider space launch vehicle as recited in claim 1 wherein the propulsion system propels the vehicle to an altitude of about 350,000 feet.

7. A towed glider space launch vehicle as recited in claim 1 wherein the propulsion system propels the vehicle to an altitude beyond the atmosphere.

8. A towed glider space launch vehicle as recited in claim 1 further comprising a second stage propulsion system connected to the spacecraft.

9. A towed glider space launch vehicle for deploying a spacecraft, the glider adapted to be towed by an aircraft and comprising:

delta wings for capable of providing all of the lift required supporting atmospheric flight of the vehicle for lifting the vehicle to a predetermined launch altitude while being towed at subsonic speeds; and     a propulsion system for propelling the glider from the predetermined altitude to an altitude from which the glider can coast beyond the sensible atmosphere.

10. A method for launch of a spacecraft carried by a launch vehicle having aerodynamic lifting surfaces providing lift sufficient to support atmospheric flight of the launch vehicle while being towed, and a propulsion system, the method comprising the steps of:

releasably attaching a tow line from a tow aircraft to the launch vehicle;

accelerating the tow aircraft to takeoff on a runway;

maintaining flight of the tow aircraft over the runway;

controlling the launch vehicle for takeoff on the runway;

ascending the tow aircraft upon takeoff of the launch vehicle;

flying the tow aircraft to a desired launch location at subsonic speeds;

starting the propulsion system of the launch vehicle;

releasing the tow line from the launch vehicle;

controlling the launch vehicle for climb to a predetermined altitude and velocity; and     ejecting the spacecraft carried by the launch vehicle.

11. A method for launch of a spacecraft carried by a second vehicle having an upper stage propulsion system, the second vehicle being carried by a launch vehicle having aerodynamic lifting surfaces providing lift sufficient to support atmospheric flight of the launch vehicle while being towed, and a propulsion system, the method comprising the steps of:

releasably attaching a tow line from a tow aircraft to the launch vehicle;

accelerating the tow aircraft to take off on a runway;

maintaining flight of the tow aircraft over the runway;

controlling the launch vehicle for takeoff on the runway;

ascending the tow aircraft upon takeoff of the launch vehicle;

flying the tow aircraft to a desired launch location at subsonic speeds;

starting the propulsion system of the launch vehicle;

releasing the tow line from the launch vehicle;

controlling the launch vehicle for climb to a predetermined altitude and velocity;

ejecting the second vehicle carrying the spacecraft; and     operating the upper stage propulsion system for insertion of the spacecraft into orbit.

12. A method for launch of a spacecraft carried by a launch vehicle having aerodynamic lifting surfaces providing lift sufficient to support atmospheric flight of the launch vehicle while being towed, and a propulsion system, the method comprising the steps of:

releasably attaching a tow line from a tow aircraft to the launch vehicle;

accelerating the tow aircraft past its rotation speed on a runway;

controlling the launch vehicle for takeoff on the runway;

rotating the tow aircraft for takeoff upon the launch vehicle attaining a suitable altitude;

flying the tow aircraft to a desired launch location at subsonic speeds;

starting the propulsion system of the launch vehicle;

releasing the tow line from the launch vehicle;

controlling the launch vehicle for climb to a predetermined altitude and velocity; and     ejecting the spacecraft carried by the launch vehicle.

13. A method for launch of a spacecraft carried by a second vehicle having an upper stage propulsion system, the second vehicle being carried by a launch vehicle having aerodynamic lifting surfaces providing lift sufficient to support atmospheric flight of the launch vehicle while being towed, and a propulsion system, the method comprising the steps of:

releasably attaching a tow line from a tow aircraft to the launch vehicle;

accelerating the tow aircraft past its rotation speed on a runway;

controlling the launch vehicle for takeoff on the runway;

rotating the tow aircraft for takeoff upon the launch vehicle attaining a suitable altitude;

flying the tow aircraft to a desired launch location at subsonic speeds;

starting the propulsion system of the launch vehicle;

releasing the tow line from the launch vehicle;

controlling the launch vehicle for climb to a predetermined altitude and velocity;

ejecting the second vehicle carrying the spacecraft; and     operating the upper stage propulsion system for insertion of the spacecraft into orbit.

14. A method for launch of a spacecraft as recited in claims 10, 11, 12, or 13 wherein the step of controlling the launch vehicle for takeoff comprises the step of remotely controlling the launch vehicle for takeoff, and wherein the step of controlling the launch vehicle for climb comprises the step of remotely controlling the launch vehicle for climb.

15. A method for launch of a spacecraft as recited in claims 10, 11, 12 or 13 further comprising the step of increasing the length of the tow line after takeoff of the launch vehicle.

16. A towed glider space launch vehicle for deploying a spacecraft, the glider adapted to be towed by an aircraft and comprising:

delta shaped aerodynamic lifting surfaces capable providing all of the lift sufficient to support atmospheric flight of the vehicle required for lifting the vehicle to a predetermined launch altitude while being towed;

a support for carrying the spacecraft; and a rocket propulsion system for increasing the velocity of the vehicle.

17. A towed glider space launch vehicle as recited in claim 16 wherein the aerodynamic lifting surfaces provide lift sufficient to support atmospheric flight of the vehicle to a predetermined launch altitude while being towed at subsonic speeds.

18. A method for launch of a spacecraft carried by a launch vehicle having delta wings for providing lift sufficient to support atmospheric flight of the launch vehicle while being towed, and a propulsion system, the method comprising the steps of:

releasably coupling the launch vehicle to tow aircraft;

accelerating the tow aircraft to takeoff on a runway;

maintaining flight of the tow aircraft;

controlling the launch vehicle for takeoff on the runway;

further ascending the tow aircraft upon takeoff of the launch vehicle;

flying the tow aircraft to a desired launch location;

starting the propulsion system of the launch vehicle;

releasing the launch vehicle from the tow aircraft;

controlling the launch vehicle for climb to a predetermined altitude and velocity; and ejecting the spacecraft carried by the launch vehicle.

19. A method as recited in claim 18 wherein the tow aircraft is a conventional aircraft.

20. A method as recited in claim 18 wherein the step of flying the tow aircraft at the desired location comprises the step of flying the tow aircraft subsonic speeds.

21. A method as recited in claim 18 wherein the spacecraft comprises an upper stage propulsion system, the method further comprising the step of operating the upper stage propulsion system for insertion of the spacecraft into orbit.

22. A method for launch of a spacecraft carried by a launch vehicle having delta wings for providing lift sufficient to support atmospheric flight of the launch vehicle while being towed, and a propulsion system, the method comprising the steps of:

releasably coupling the launch vehicle to a tow aircraft;

accelerating the tow aircraft on a runway;

controlling the launch vehicle for takeoff on the runway;

rotating the tow aircraft for takeoff upon the launch vehicle attaining a suitable altitude;

flying the tow aircraft to a desired launch location;

starting the propulsion system of the launch vehicle;

releasing the launch vehicle from the tow aircraft;

controlling the launch vehicle for climb to a predetermined altitude and velocity; and ejecting the spacecraft carried by the launch vehicle.

23. A method as recited in claim 22 wherein the tow aircraft is a conventional aircraft.

24. A method as recited in claim 22 wherein the step of flying the tow aircraft at the desired location comprises the step of flying the tow aircraft subsonic speeds.

25. A method as recited in claim 22 wherein the spacecraft comprises an upper stage propulsion system, the method further comprising the step of operating the upper stage propulsion system for insertion of the spacecraft into orbit.

26. A method for launch of a spacecraft carried by a launch vehicle having lifting surfaces for providing lift sufficient to support atmospheric flight of the launch vehicle while being towed by a tow aircraft, and a propulsion system, the method comprising the steps of:

releasably coupling the launch vehicle to a tow aircraft for being towed by the aircraft;

accelerating the tow aircraft to takeoff on a runway;

maintaining flight of the tow aircraft;

controlling the launch vehicle for takeoff on the runway;

further ascending the tow aircraft upon takeoff of the launch vehicle;

flying the tow aircraft to a desired launch location at subsonic speeds;

starting the propulsion system of the launch vehicle, releasing the launch vehicle from the tow aircraft;

controlling the launch vehicle for climb to a predetermined altitude and velocity; and ejecting the spacecraft carried by the launch vehicle.

27. A method as recited in claim 26 wherein the spacecraft comprises an upper stage propulsion system, the method further comprising the step of operating the upper stage propulsion system for insertion of the spacecraft into orbit.

28. A method for launch of a spacecraft carried by a launch vehicle having lifting surfaces for providing lift sufficient to support atmospheric flight of the launch vehicle while being towed by a tow aircraft, and a propulsion system, the method comprising the steps of:

releasably coupling the launch vehicle to a tow aircraft for being towed by the tow aircraft;

accelerating the tow aircraft on a runway;

controlling the launch vehicle for takeoff on the runway;

rotating the tow aircraft for takeoff upon the launch vehicle attaining a suitable altitude;

flying the tow aircraft to a desired launch location at subsonic speeds;

starting the propulsion system of the launch vehicle;

releasing the launch vehicle from the aircraft;

controlling the launch vehicle for climb to a predetermined altitude and velocity; and ejecting the spacecraft carried by the launch vehicle.

29. A method as recited in claim 28 wherein the spacecraft comprises an upper stage propulsion system, the method further comprising the step of operating the upper stage propulsion system for insertion of the spacecraft into orbit.

30. A towed vehicle space launch system for deploying a spacecraft, the system comprising:

a spacecraft;

a launch vehicle adapted to be towed by an aircraft and comprising, delta wings for providing lift sufficient to support atmospheric flight of the launch vehicle, a support for carrying the spacecraft, and a rocket propulsion system for increasing the velocity of the vehicle; and a tow aircraft for towing the launch vehicle to a predetermined launch altitude wherein the tow aircraft provides thrust to the launch vehicle and wherein the delta wings are capable of providing all of the lift required for attaining the predetermined altitude.

31. A system as recited in claim 28 wherein the delta wings provide all of the lift to the launch vehicle for attaining the predetermined altitude.

32. A system as recited in claim 28 further comprising a second stage propulsion system coupled to the spacecraft.

33. A towed vehicle space launch system for deploying a spacecraft, the system comprising:

a spacecraft;

a launch vehicle adapted to be towed by a tow aircraft and comprising, aerodynamic lifting surfaces for providing lift sufficient to support atmospheric flight of the launch vehicle, a support for carrying the spacecraft, and a rocket propulsion system for increasing the velocity of the vehicle; and a tow aircraft for towing the launch vehicle to a predetermined launch altitude at subsonic speeds wherein the tow aircraft provides thrust to the launch vehicle and wherein the lifting surfaces are capable of providing all of the lift required for attaining the predetermined altitude.

34. A system as recited in claim 33 wherein the lifting surfaces provide all of the lift to the launch vehicle for attaining the predetermined altitude.

35. A system as recited in claim 33 further comprising a second stage propulsion system coupled to the spacecraft.

36. A system as recited in claim 33 wherein the lifting surfaces are delta wings.

37. A towed vehicle space launch system for deploying a spacecraft, the system comprising:
 a spacecraft;
 a launch vehicle adapted to be towed by an aircraft and comprising,
  delta wings for providing lift sufficient to support atmospheric flight of the launch vehicle,
  a support for carrying the spacecraft, and
  a propulsion system for propelling the vehicle to an altitude from which the vehicle can coast beyond the sensible atmosphere; and
 a tow aircraft for towing the launch vehicle to a predetermined launch altitude wherein the tow aircraft provides thrust to the launch vehicle and wherein the delta wings are capable of providing all of the lift required for attaining the predetermined altitude.

38. A towed vehicle space launch system for deploying a spacecraft, the system comprising:
 a spacecraft;
 a launch vehicle adapted to be towed by a tow aircraft and comprising,
  aerodynamic lifting surfaces for providing lift sufficient to support atmospheric flight of the launch vehicle,
  a support for carrying the spacecraft, and
  a propulsion system for propelling the vehicle to an altitude from which the vehicle can coast beyond the sensible atmosphere; and
 a tow aircraft for towing the launch vehicle to a predetermined launch altitude at subsonic speeds wherein the tow aircraft provides thrust to the launch vehicle and wherein the lifting surfaces are capable of providing all of the lift required for attaining the predetermined altitude.

39. A towed vehicle space launch system for deploying a spacecraft, the system comprising:
 a spacecraft;
 a launch vehicle adapted to be towed by an aircraft and comprising,
  variable sweep wings for providing lifts sufficient to support atmospheric flight of the launch vehicle,
  a support for carrying the spacecraft, and
  a rocket propulsion system for increasing the velocity of the vehicle; and
 a tow aircraft for towing the launch vehicle to a predetermined launch altitude at subsonic speed, wherein the tow aircraft provides only thrust to the launch vehicle and wherein the lifting surfaces are capable of providing all of the lift required for attaining the predetermined altitude.

40. A towed vehicle space launch system for deploying a spacecraft, the system comprising:
 a spacecraft;
 a launch vehicle adapted to be towed by an aircraft and comprising,
  X-wings for providing lift sufficient to support atmospheric flight of the launch vehicle,
  a support for carrying the spacecraft, and
  a of a rocket propulsion system for increasing the velocity of the vehicle; and
 a tow aircraft for towing the launch vehicle to a predetermined launch altitude, wherein the tow aircraft provides thrust to the launch vehicle and wherein the lifting surfaces are capable of providing all part of the lift required for attaining the predetermined altitude.

* * * * *

UNITED STATES PATENT AND TRADEMARK OFFICE
CERTIFICATE OF CORRECTION

PATENT NO.   : 6,029,928
DATED        : February 29, 2000
INVENTOR(S)  : Michael S. Kelly It is certified that error appears in the above-identified patent and that said Letters Patent is hereby corrected as shown below:

Title page,
Item [56], References Cited, under "U.S. PATENT DOCUMENTS" insert the following reference:
    5,088,663   2/1992   Henson ......244/137.4

Column 12,
Line 56, after "surfaces capable" insert -- of --.

Column 14,
Line 51, replace "in claim 28" with -- in claim 30 --.
Line 54, replace "in claim 28" with -- in claim 30.--.

Column 16,
Line 36, replace "providing all part of the" with -- providing all of the --.

Signed and Sealed this

Fifteenth Day of January, 2002

Attest:

JAMES E. ROGAN
*Director of the United States Patent and Trademark Office*

*Attesting Officer*